United States Patent [19]
Brookfield

[11] Patent Number: 5,941,172
[45] Date of Patent: *Aug. 24, 1999

[54] TRANSFER PRINTING AND LAMINATING BLANKET

[75] Inventor: Frank Brookfield, Rochdale, United Kingdom

[73] Assignee: Scapa Group Plc, Blackburn, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/836,126
[22] PCT Filed: Nov. 10, 1995
[86] PCT No.: PCT/GB95/02627
  § 371 Date: Aug. 8, 1997
  § 102(e) Date: Aug. 8, 1997
[87] PCT Pub. No.: WO96/14991
  PCT Pub. Date: May 23, 1996

[30] Foreign Application Priority Data

Nov. 16, 1994 [GB] United Kingdom ............ 9423138

[51] Int. Cl.$^6$ ............................ B41F 13/10
[52] U.S. Cl. .................. 101/379; 101/217; 428/909
[58] Field of Search .................. 101/379, 217, 101/375; 428/909

[56] References Cited

U.S. PATENT DOCUMENTS

| | | | |
|---|---|---|---|
| 3,983,287 | 9/1976 | Gossen et al. | 428/241 |
| 4,015,046 | 3/1977 | Pinkston et al. | 428/520 |
| 4,174,244 | 11/1979 | Thomas et al. | 156/242 |
| 5,113,760 | 5/1992 | Sonobe et al. | 101/348 |
| 5,294,481 | 3/1994 | Nakamura et al. | 428/245 |
| 5,347,927 | 9/1994 | Berna et al. | 101/401.1 |
| 5,366,799 | 11/1994 | Pinkston et al. | 428/250 |

*Primary Examiner*—Edgar Burr
*Assistant Examiner*—Dave A. Ghatt
*Attorney, Agent, or Firm*—Jacobson, Price, Holman & Stern, PLLC

[57] ABSTRACT

A dual purpose transfer printing and laminating blanket (18) has an endless woven base fabric (28) having at least one layer of fluoropolymer coating material (32, 33) applied thereto. A bonding layer is applied to each side of the base fabric, to bond the at least one layer to the base fabric.

8 Claims, 2 Drawing Sheets

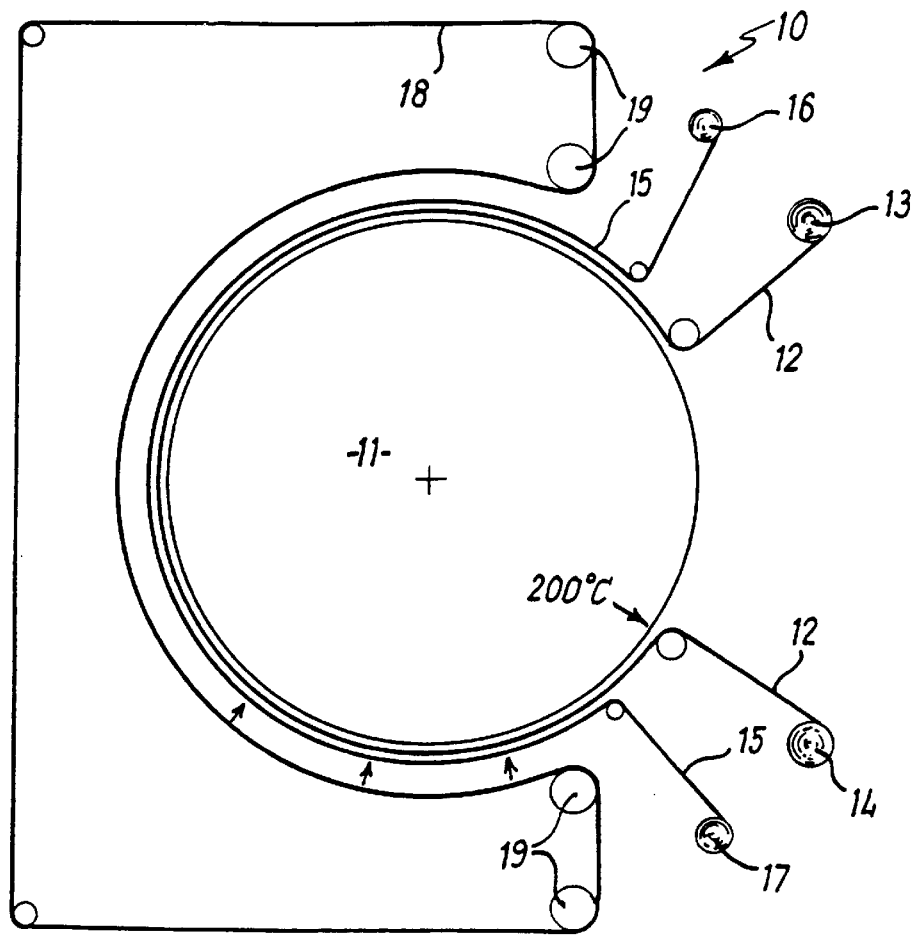
_Fig. 1_
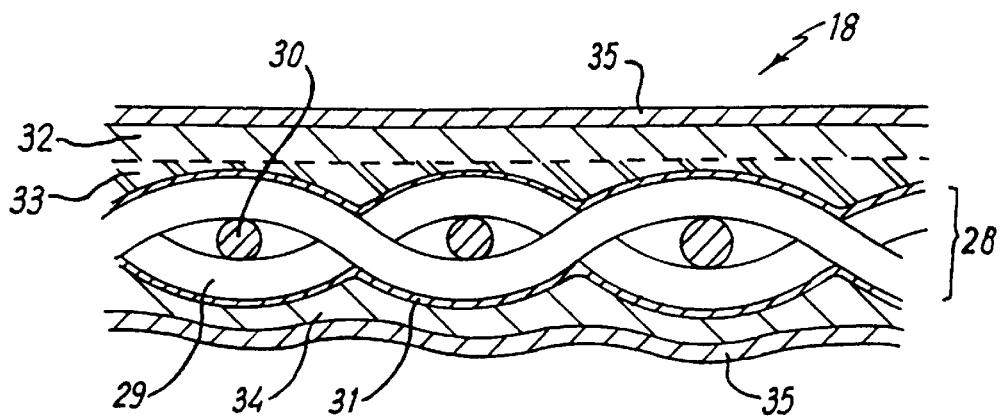
_Fig. 3_

TRANSFER PRINTING AND LAMINATING BLANKET

BACKGROUND OF THE INVENTION

1. Field of the Invention

The present invention relates to a transfer printing and laminating blanket.

2. Description of Related Art

Transfer printing is usually carried out using a calender-type machine equipped with an endless NOMEX (R.T.M.) needlefelt blanket. The blanket comprises a woven basecloth onto which one or more layers of staple fibres are applied by needling. The blanket generally comprises a standard polyester, NOMEX (R.T.M.) OR KEVLAR (R.T.M.) base-cloth onto which high temperature resistant staple NOMEX (R.T.M.) fibres are needled.

It is proposed that a calender-type transfer printing machine be used both for transfer printing and laminating. A conventional transfer printing blanket would be unsuitable as a dual purpose transfer printing blanket and laminating belt. This is because these known needlefelt blankets would be readily contaminated by the hot melt adhesives used during the laminating process. The contaminants would pose a problem in the transfer printing process. In view of this silicone coated blankets have been proposed, but these have proven to be unsuccessful because of the temperature, chemical and physical limitations of silicone rubber at the operating temperature of the calender machines which may be as high as 260° C.

SUMMARY OF THE INVENTION

The present invention seeks to provide a blanket, to be used for both transfer printing and laminating, which offers a satisfactory solution to the problem of hot melt adhesive contamination.

According to the present invention there is provided a dual purpose transfer printing and laminating blanket, said blanket comprising an endless woven base fabric and at least one layer of a fluoropolymer coating material applied thereto.

The blankets of the invention achieve as good a print as is achieved with the traditional blankets as described herein, but substantially avoid the potential problems of contamination of such traditional blankets owing to the smooth, non-stick impermeable fabric surface. The blankets of the invention further exhibit superior heat resistance, chemical inertness, hardness and suppleness.

The thickness of the fabrics of the invention is preferably at least 1.5 mm and is more preferably in the range from 1.5 mm to 7 mm.

The coating may include silicate bodies therein thereby to mask the fabric interstices and substantially avoid manifestation of the base fabric at the belt surface. Ideally, the silicate bodies comprise glass beads having a diameter in the range 2 to 200 microns. Preferably the silicate bodies have a diameter monosized at approximately 90 microns. Multiple coating layers may be provided. Ideally the silicate bodies exist in each coating layer in like amount by weight to the coating material. More preferably the multiple thin layers include at least one bonding layer applied to the woven base fabric.

The coating is preferably applied to any one side of the fabric, preferably the face side, but may be applied to both sides. The preferred method of coating includes the use of a doctor blade. Alternatively, the fabric coating may be provided by means of dip and/or lick coating. The upper layer of fluoropolymer coating may contain metal powder, for example of stainless steel, bronze or nickel, to reflect heat back into the article being the subject of the transfer printing or laminating process.

The fabric may typically have a semi-triplex of plain weave structure, optionally with one or more layers of fibres needled onto one side, usually the backside of the fabric. Examples of suitable fabric materials include any of the following either alone or in combination: glass, ceramic, metal, PEEK, meta- and para-aramid fibres, filaments and spun yarns. Width stability to avoid blanket creasing can be improved, particularly for wide blankets, by incorporating metal wires, for example stainless steel or bronze, into the fabric. These wires can run in either or both of the machine direction or cross-machine direction of the fabric.

BRIEF DESCRIPTION OF THE DRAWINGS

In order that the present invention may be more readily understood a specific embodiment thereof will now be described by way of example only with reference to the accompanying drawings in which:

FIG. 1 is a diagrammatic view of a calender machine equipped with a blanket in accordance with the present invention;

FIG. 3 is a longitudinal section taken through the blanket in accordance with the present invention.

DETAILED DESCRIPTION OF THE PREFERRED EMBODIMENTS

Figure 2:
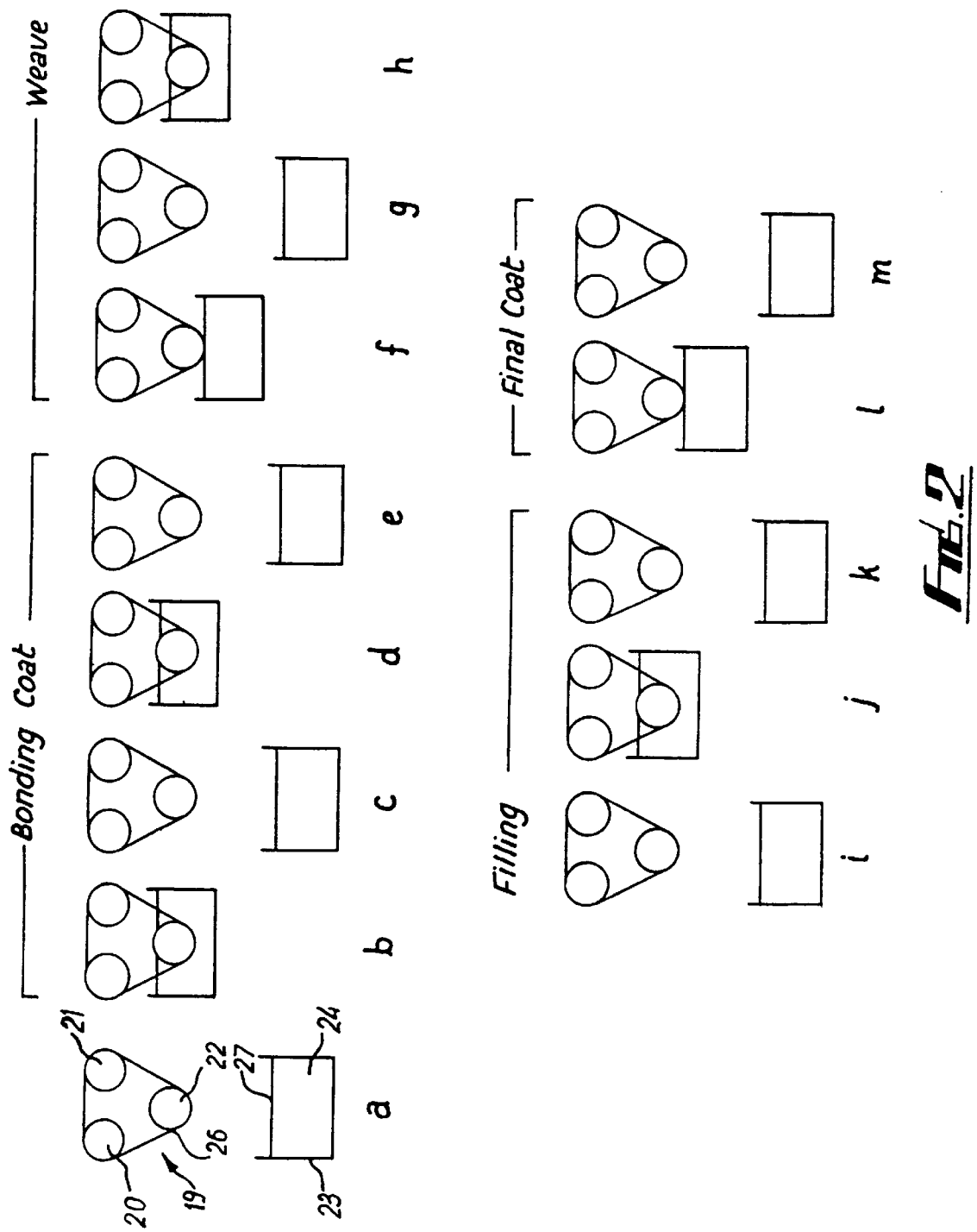
FIG. 2 illustrates the method steps for making the blanket shown in FIG. 1.

Referring to FIG. 1 a calender machine 10 comprises a rotating drum 11 heated to 200° C. The heat from the drum 11 acts upon a sheet of sublimistic paper 12 which is fed around the drum 11 from a first set of rollers 13 to a second set of rollers 14. The sublimistic paper is a pattern-embossed paper supporting sublimistic dyestuffs. A sheet of material 15 which is to be printed, such as a knitted polyester fabric, is passed over the sublimistic paper from a first set of rollers 16 to a second set of rollers 17.

An endless transfer printing blanket 18 extends over a series of rollers 19. The transfer printing blanket urges the material to be printed against the sublimistic paper.

When in operation the heated drum 11 heats the dyestuffs which sublime and re-form on the material to be printed, thus transferring the pattern of the sublimistic paper to the material to be printed. The transfer blanket is used to ensure that a uniform print is applied to the material.

The calender member 10, may be used for laminating by substituting the sublimistic paper for a hot melt adhesive film in order to apply the hot melt film to a fabric.

Referring now to FIGS. 2 and 3 in coating a woven base fabric to provide a transfer printing blanket 18 an endless woven fabric 19 is supported, under tension, on a plurality of horizontal rollers 20,21,22 arranged in spaced apart disposition above a supply of coating material contained in a tank 23 and is successively engaged with and withdrawn from coating material 24 present in the tank 23 to take up material therefrom.

Conveniently the tank 23 is raised or lowered so as to bring the coating material 24 into contact with the blanket 18 for the time being existing on the rollers 20,21,22, the extent of movement being such as to cause the lower part 26 of the blanket 18 to become immersed in the coating material 14 or simply to engage the surface 27 thereof according to the nature of the coating step required.

In the arrangement illustrated three rollers are provided, two such rollers 20,21 being arranged at a common level and serving to support the fabric 19/blanket 18 and the third roller 22 being at a lower level and operating as a guide roller to position the lower part 26 of the fabric/belt. At least one of the upper rollers 20,21 is driven so as to rotate the fabric/belt about the roller arrangement.

The process steps are shown in FIG. 2 and comprise, in succession, dip coating steps, FIGS. 2b to 2e, a lick-coating step, FIGS. 2f and 2g, two-dip-coating steps, FIGS. 2h to 2k, and a further lick-coating step, FIGS. 21 and 2m, each step including drying/sintering of the applied layer, FIGS. 2c, 2e, 2g, 2i, 2k and 2m.

The base fabric 28, see FIG. 3, is of plain weave construction and is woven from 1100 d.tex Kevlar (R.T.M.) or Technora (R.T.M.) multi-filament yarns 29,30 from the warp and weft densities in the loom being 11.22 and 9.45 yarns/cm. The fabric weight is 225 grams/meter$^2$ and the fabric thickness is 0.36 mm.

On tensioning of the base fabric the length thereof increases by approximately 1.9% whilst the width reduces by approximately 4.4%, the fabric thickness increasing to 0.43 mm.

The initial dip coating steps serve to apply a bonding coat 31 to the base fabric 28 and the mix is merely a polytetrafluoroethylene bonding material. For the initial lick coating step, which step forms coating layer 33 at the support side of the base fabric, and the remaining dip coating steps, which apply coating material to both sides of the fabric, that is to say for the weave filling steps which form coating layers 32,34 at the respective sides of the fabric, the mix also includes silicate bodies, typically solid glass beads having a diameter of between 53 and 105 microns but preferably monosized at approximately 90 microns. Indeed, it is believed that the use of monosized beads offers improved weave filling as compared with the use of beads of a size randomly distributed with a range of diameters. Typically, the silicate bodies are present in the relevant coating layers in like amount by weight to the dried/sintered P.T.F.E. coating material. The final coating step applies a top coat 35 of P.T.F.E. having metallic particles/flake included therein. An additional weave final coating step will ordinarily be applied, notwithstanding that such additional step is not shown in FIG. 2.

Thus, the bonding coat 31 consists of two layers at each side of the belt to give a total coating weight of 250 grams/meter$^2$ whilst the weave filling coats 32,33,34 which respectively comprise three coating layers and two coating layers, have a total weight of 400 grams/meter$^2$. The final or top coats 35, each of which comprises two layers, have a total weight of 100 grams/meter$^2$. The finished thickness of the coated belt is 0.69 mm.

The blanket is illustrated diagrammatically in FIG. 3, it being seen that the bonding layers, which layers promote adhesion of the subsequent coating layers to the base fabric, permeate the surface of the multifilament yarns and bridge the interstices in the fabric and that the glass beads serve to fill the recesses in and defined by the bonding layers to give a substantially flat outer surface to the belt particularly at the support side thereof, the top coating being of sensibly constant thickness and thus having a surface form of similar character to that formed by the weave filling layers. It will be appreciated, of course, that, after coating, the belt will be calendered.

The blanket of the invention is not restricted to the detail of the embodiment hereinbefore described, since alternatives will readily present themselves to one skilled in the art. Thus, for example, whilst the bonding coats do improve adhesion of the weaving filling layers to the base weave, the bonding coats may, in some circumstances, be omitted.

The number of weave-filling layers may be varied according to specific requirements and more than one such layer may be applied by lick coating. The solids content of the PTFE dispersion may be other than 50% indeed an increased solids content, say to 70%, is desirable as this reduces the tendency of the coating to contour the fabric weave structure. The increased solids content also facilitates weave filling and drying/sintering of the PTFE, and has advantageous effects on the thermal characteristics of the belt in use.

Other weave constructions and other yarns, for example glass yarns, may, of course, be used, and the PTFE coating material may include such additives as are appropriate to introduce requisite characteristics into the belt according to its intended end use. For example, it may be found convenient to use metallized beads, whether in the weave filling layers and/or in the top coat, and thus dispense with the need to include metallic particles/flake in the top coat.

I claim:

1. A dual purpose transfer printing and laminating blanket comprising an endless woven base fabric, at least one coating layer applied to each side of said base fabric and at least one top coat provided over said coating layers on each side of the base fabric, at least one of said top coat comprising a fluoropolymer material and providing a smooth and substantially flat outer support surface.

2. A dual purpose transfer printing and laminating blanket according to claim 1, wherein at least one of said coating layers include silicate bodies therein, to thereby mask the interstices of the woven base fabric and substantially avoid manifestation of the base fabric at the belt surface.

3. A dual purpose transfer printing and laminating blanket according to claim 2, wherein said silicate bodies comprise glass beads having a diameter in the range from 2 to 200 microns.

4. A dual purpose transfer printing and laminating blanket according to claim 3, wherein the silicate bodies have a substantially uniform diameter of approximately 90 microns.

5. A dual purpose transfer printing and laminating blanket according to claim 1, wherein the blanket has a thickness of from 1.5 to 7.0 mm.

6. A dual purpose transfer printing and laminating blanket according to claim 1, wherein each said coating layer includes silicate bodies which comprises or includes a fluoropolymer material.

7. A dual purpose transfer printing and laminating blanket according to claim 6, wherein the silicate bodies are provided in each coating layer in approximately equal proportions.

8. A dual purpose transfer printing and laminating blanket according to claim 1, wherein the fluoropolymer coating includes metal powder.

\* \* \* \* \*